United States Patent
Rowells

(10) Patent No.: US 9,657,633 B2
(45) Date of Patent: May 23, 2017

(54) SWIRL-INDUCING INTAKE VALVE ARRANGEMENT

(75) Inventor: Robert Lawrence Rowells, Elmwood Park, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 292 days.

(21) Appl. No.: 14/395,664

(22) PCT Filed: Apr. 25, 2012

(86) PCT No.: PCT/US2012/034845
§ 371 (c)(1),
(2), (4) Date: Oct. 20, 2014

(87) PCT Pub. No.: WO2013/162527
PCT Pub. Date: Oct. 31, 2013

(65) Prior Publication Data
US 2015/0083077 A1    Mar. 26, 2015

(51) Int. Cl.
| | | |
|---|---|---|
| *F02B 31/00* | (2006.01) | |
| *F02B 31/02* | (2006.01) | |
| *F02B 31/08* | (2006.01) | |
| *F02F 1/42* | (2006.01) | |

(52) U.S. Cl.
CPC .............. *F02B 31/02* (2013.01); *F02B 31/08* (2013.01); *F02F 1/4235* (2013.01); *Y02T 10/146* (2013.01)

(58) Field of Classification Search
CPC .... F02B 31/00; F02B 2031/006; F02B 31/02; F02B 31/04; F02B 31/06; F02B 31/08; F02B 31/082; F02B 31/085; F02F 1/34; F02F 1/425; F02F 1/421
USPC ......................................... 123/306, 308, 432
See application file for complete search history.

(56) References Cited

U.S. PATENT DOCUMENTS

| | | | | |
|---|---|---|---|---|
| 4,249,495 A | * | 2/1981 | Trihey | F02B 17/00 123/308 |
| 4,285,310 A | * | 8/1981 | Takizawa | F01L 1/26 123/308 |
| 4,317,438 A | * | 3/1982 | Yagi | F02B 23/08 123/308 |
| 4,523,560 A | * | 6/1985 | Motosugi | F02B 23/08 123/308 |

(Continued)

*Primary Examiner* — Thomas Moulis
(74) *Attorney, Agent, or Firm* — Jack D. Nimz; Jeffrey P. Calfa

(57) ABSTRACT

First intake valve and second intake valve for an engine cylinder bore within which a piston reciprocates are arranged side-by-side in a cylinder head for motion in unison along respective intake valve axes. First intake valve axis is nonparallel to the cylinder bore axis. A first intake valve seat for the first intake valve is disposed in a plane which is non-parallel to a plane which is perpendicular to the cylinder bore axis. First intake valve seat has a first semi-circumference toward a second semi-circumference of a second valve seat for second intake valve. At least a portion of first semi-circumference is closer, as measured along a direction parallel to the cylinder bore axis, to a plane passing through the piston perpendicular to the cylinder bore axis than is the second semi-circumference as measured along a direction parallel to the cylinder bore axis.

5 Claims, 3 Drawing Sheets

(56) References Cited

U.S. PATENT DOCUMENTS

| | | | | |
|---|---|---|---|---|
| 4,543,931 A * | 10/1985 | Hitomi | F02B 23/08 | 123/184.45 |
| 4,548,175 A * | 10/1985 | Kawai | F01L 1/26 | 123/188.14 |
| 4,593,662 A * | 6/1986 | Baring | F01L 1/2405 | 123/198 F |
| 4,667,636 A * | 5/1987 | Oishi | F01L 1/265 | 123/308 |
| 4,669,434 A * | 6/1987 | Okumura | F02B 31/085 | 123/188.14 |
| 4,688,532 A * | 8/1987 | Hasegawa | F02B 31/00 | 123/302 |
| 4,732,117 A * | 3/1988 | Tanahashi | F02M 26/01 | 123/193.4 |
| 4,856,473 A * | 8/1989 | Kawai | F02B 17/00 | 123/184.45 |
| 5,138,989 A * | 8/1992 | Fraidl | F02D 13/023 | 123/193.5 |
| 5,269,270 A * | 12/1993 | Suzuki | F01L 1/267 | 123/193.5 |
| 5,394,845 A * | 3/1995 | Noh | F02B 31/00 | 123/188.14 |
| 5,551,393 A * | 9/1996 | Amano | F02B 31/04 | 123/193.5 |
| 5,595,156 A * | 1/1997 | Tsuzuku | F01L 1/265 | 123/306 |
| 5,634,444 A * | 6/1997 | Matsuki | F01L 3/22 | 123/188.14 |
| 5,794,587 A * | 8/1998 | Isaka | F02B 31/087 | 123/308 |
| 5,855,194 A * | 1/1999 | Okumura | F02B 31/082 | 123/308 |
| 6,055,958 A * | 5/2000 | Aoyama | F02B 31/087 | 123/184.55 |
| 6,065,444 A * | 5/2000 | Jingu | F02B 17/005 | 123/301 |
| 6,213,090 B1 * | 4/2001 | Tamai | F02B 31/085 | 123/308 |
| 9,074,519 B2 * | 7/2015 | Canino | F02B 23/04 | |
| 2002/0185105 A1 * | 12/2002 | Martin | F01L 1/26 | 123/308 |
| 2003/0010318 A1 * | 1/2003 | Kuroda | F01L 1/024 | 123/432 |
| 2005/0172932 A1 * | 8/2005 | Arimatsu | F01L 13/0036 | 123/308 |
| 2009/0000590 A1 * | 1/2009 | Buhr | F02B 17/00 | 123/193.5 |
| 2015/0345420 A1 * | 12/2015 | Han | F01L 1/265 | 123/308 |

* cited by examiner

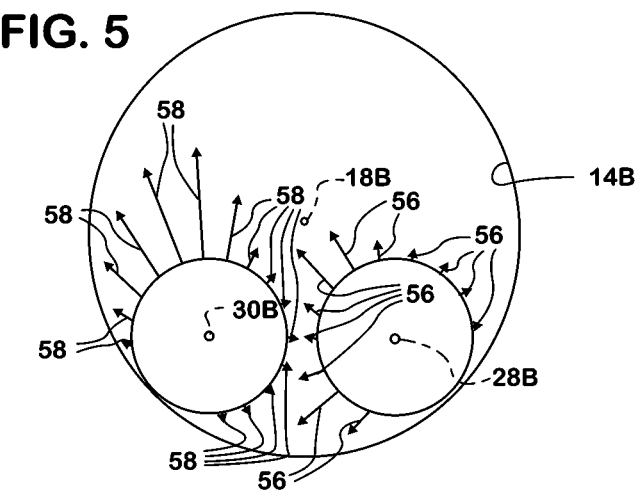
FIG. 5
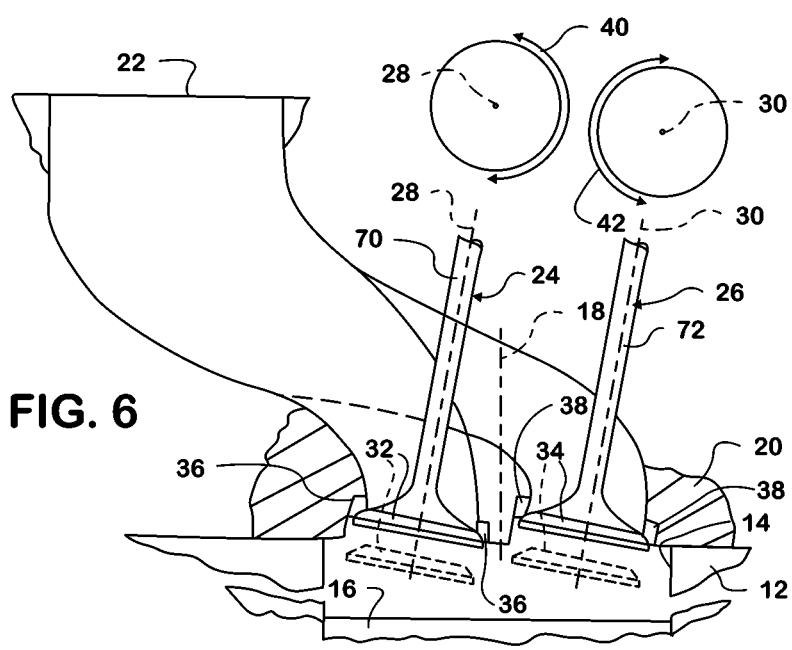
FIG. 7
FIG. 6

SWIRL-INDUCING INTAKE VALVE ARRANGEMENT

FIELD

The subject matter of the present disclosure relates to an internal combustion engine of the type having engine cylinders within which pistons reciprocate. The disclosed subject matter relates particularly to an intake valve arrangement for inducing in-cylinder swirl of intake flow which has passed through an engine intake system and enters an engine cylinder through a pair of intake valves which have been unseated from respective intake valve seats.

BACKGROUND

Fuel can be more completely combusted within a cylinder of an internal combustion engine by creating a more homogeneous mixture of fuel and fresh air. Inducing swirling motion, i.e. swirl, of fresh air within an engine cylinder can promote more homogeneous mixing, particularly when fuel is injected directly into the engine cylinder before the onset of combustion.

A known construction for imparting swirl to intake flow as the flow enters an engine cylinder through an open intake valve comprises a swirl-inducing structure in an intake port of the engine cylinder upstream of the intake valve. The presence of such a structure however contributes to restriction of the intake flow, and such restriction may have one or more various side effects on combustion and/or engine performance.

Certain engines comprise multiple intake valves for a single engine cylinder. In the absence of any swirl-inducing structure, the presence of multiple intake valves is generally ineffective in imparting in-cylinder swirl to intake flow entering an engine cylinder. The presence of certain swirl inducing structures may be effective to impart some swirl.

SUMMARY OF THE DISCLOSURE

The disclosed internal combustion engine comprises an arrangement of dual intake valves for an engine cylinder which is effective to increase in-cylinder swirl of intake flow, and consequently promote the creation of a more homogeneous fuel/air mixture in the cylinder.

The engine comprises a cylinder block comprising a cylinder bore within which a piston reciprocates along a cylinder bore axis.

A cylinder head is assembled to the cylinder block in covering relation to an axial end of the cylinder bore and comprises an inlet port to the cylinder bore.

A first intake valve and a second intake valve are arranged side-by-side in the cylinder head for motion along a first intake valve axis and along a second intake valve axis respectively to open and close the inlet port to the cylinder bore. The first intake valve comprises a first intake valve head, and the second intake valve comprises a second intake valve head.

The cylinder head comprises a first intake valve seat against which the first intake valve head seats when closing the inlet port to the cylinder bore and a second intake valve seat against which the second intake valve head seats when closing the inlet port to the cylinder bore.

An actuator opens and closes the intake valves in unison to unseat and re-seat the intake valve heads from and on the respective intake valve seats.

The first intake valve axis is non-parallel to the cylinder bore axis, and the first intake valve seat is disposed in a plane which is non-parallel to a plane which is perpendicular to the cylinder bore axis.

The first intake valve seat has a first semi-circumference and the second intake valve seat has a second semi-circumference. The first semi-circumference and the second semi-circumference are toward each other as viewed along the cylinder bore axis. At least a portion of the first semi-circumference is closer, as measured along a direction parallel to the cylinder bore axis, to a plane passing through the piston perpendicular to the cylinder bore axis than is the second semi-circumference as measured along a direction parallel to the cylinder bore axis.

The foregoing summary is accompanied by further detail of the disclosure presented in the Detailed Description below with reference to the following drawings which are part of the disclosure.

BRIEF DESCRIPTION OF THE DRAWINGS

FIGS. 1 and 6 are partial elevation views of a first intake valve and a second intake valve of an internal combustion engine cylinder.

FIG. 5 is diagram useful in contrasting swirl development inside the engine cylinders shown in both FIGS. 1 and 6 with another engine cylinder which does not have the cylinder intake valve arrangement shown in FIGS. 1 and 6.

FIG. 7 is a projection view of a portion of FIG. 6

DETAILED DESCRIPTION

Figure 1:
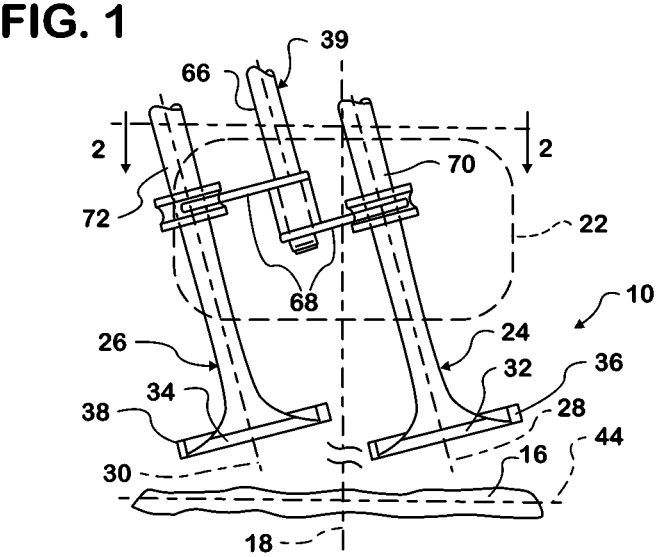
Figure 2:
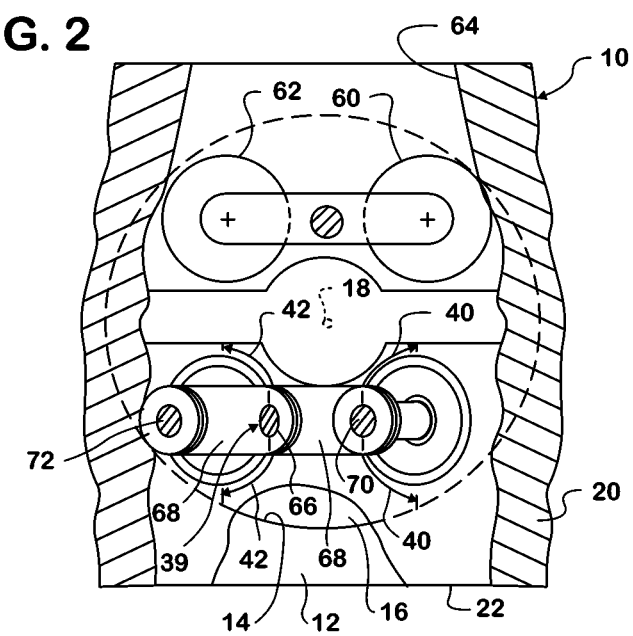
FIG. 2 is a view in the direction of arrows 2-2 in FIG. 1 showing additional structural detail.

FIGS. 1 and 2 show a portion of an internal combustion engine 10, a diesel engine for example, which may be used as the powerplant of a motor vehicle such as a truck (not shown in the drawing) for propelling the motor vehicle.

Engine 10 comprises an engine cylinder block 12 containing multiple engine cylinder bores 14, like the single one illustrated, typically lined by cylinder liners. A respective piston 16 reciprocates within each engine cylinder bore 14 along a cylinder bore axis 18 and is coupled by a respective connecting rod (not shown) to a crankshaft (also not shown).

Engine 10 further comprises an engine cylinder head 20 which closes an axial end of engine cylinder bore 14 to define between itself and the head of piston 16, a variable volume combustion chamber space. An inlet port 22 in engine cylinder head 20 communicates an intake system (not shown) to engine cylinder bore 14 so that flow which has passed through the intake system can enter the combustion chamber space.

A first intake valve 24 and a second intake valve 26 are arranged side-by-side in engine cylinder head 20 for motion along a first intake valve axis 28 and along a second intake valve axis 30 respectively to open and close inlet port 22 to engine cylinder bore 14. First intake valve 24 comprises a first intake valve head 32, and second intake valve 26 comprises a second intake valve head 34.

Engine cylinder head 20 comprises a first intake valve seat 36 against which first intake valve head 32 seats when closing inlet port 22 to engine cylinder bore 12 and a second intake valve seat 38 against which second intake valve head 34 seats when closing inlet port 22 to engine cylinder bore 14.

An actuator 39 opens and closes first and second intake valves 24, 26 in unison to unseat and re-seat first and second intake valve heads 32, 34 from and on the respective intake valve seats 36, 38.

First intake valve axis 28 is non-parallel to cylinder bore axis 18, and first intake valve seat 36 is disposed in a plane which is non-parallel to a plane which is perpendicular to cylinder bore axis 18.

First intake valve seat 36 has a first semi-circumference 40 and the second intake valve seat 38 has a second semi-circumference 42. First semi-circumference 40 and second semi-circumference 42 are toward each other as viewed along cylinder bore axis 18.

At least a portion of first semi-circumference 40 is, as measured along a direction parallel to cylinder bore axis 18, closer to an imaginary plane 44 passing through piston 16 perpendicular to cylinder bore axis 18 than is second semi-circumference 42 as measured along a direction parallel to cylinder bore axis 18.

Figure 3:
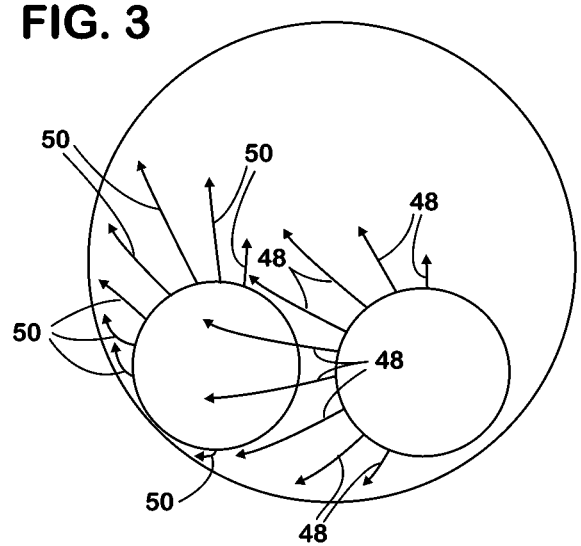
FIG. 3 is diagram illustrating swirl development inside the engine cylinders of both FIGS. 1 and 6.

Because at least a portion of first semi-circumference 40 is closer to plane 44 than is second semi-circumference 42, intake flow which passes through an annular space between first intake valve head 32 and first intake valve seat 36 when first intake valve 24 is unseated will flow from that annular space in the sense indicated by arrows 48 in FIG. 3.

Each arrow 48 represents a direction of flow, with the arrow's length representing a relative magnitude of flow velocity. FIG. 3 shows that significant swirl is imparted to the in-cylinder flow which has passed through first intake valve 24. Significant swirl is achieved in the flow coming from first intake valve 24 because of decreased obstruction by second intake valve 26.

FIG. 3 further shows that flow, represented by arrows 50, coming from an annular space between second intake valve head 34 and second intake valve seat 38 is guided into circumferential swirl by the liner surface of cylinder bore 14 at a location which is closer to cylinder head 18, enabling some of the flow coming from first intake valve 24 to flow underneath and make the swirls from the two intake valves generally additive. Because second semi-circumference 42 is shrouded by cylinder head 20 not only when second intake valve 26 is closed but also when second intake valve 26 is open, little or no intake flow can pass through second semi-circumference 42 when second intake valve 26 is open, thereby forcing intake flow through the opposite semi-circumference.

Figure 4:
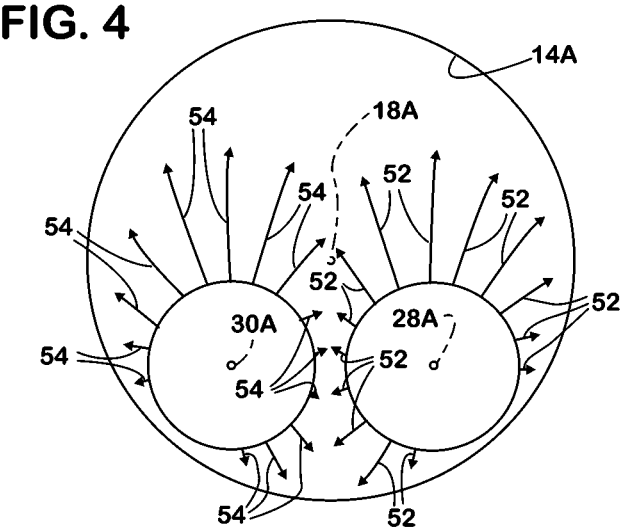
FIG. 4 is diagram useful in contrasting swirl development inside the engine cylinders shown in both FIGS. 1 and 6 with an engine cylinder which does not have the cylinder intake valve arrangement shown in FIGS. 1 and 6.

By contrasting FIG. 4 with FIG. 3, one can see that swirl development inside engine cylinder bore 14 is significantly greater than in a cylinder bore 14A which lacks swirl-inducing structure and which has dual cylinder intake valves whose axes 28A, 30A parallel the cylinder bore axis 14A and whose intake valve seats are disposed in a common plane perpendicular to cylinder bore axis 18A. The respective flows represented by arrows 52, 54 are small because the respective intake flows coming from the confronting semi-circumferences in essence have no place to go forcing predominant flow around the cylinder bore as indicated by the longer arrows 52, 54 which show little swirl.

By contrasting FIG. 5 with FIG. 3, one can see that swirl development inside engine cylinder bore 14 as shown in FIG. 1 is also significantly greater than in a cylinder bore 14B which has swirl-inducing structure upstream of dual cylinder intake valves whose axes 28B, 30B parallel the cylinder bore axis 18B and whose intake valve seats are disposed in a common plane perpendicular to cylinder bore axis 18B. In the same way as in FIG. 4, the respective flows represented by the shorter arrows 56, 58 which confront each other in FIG. 5 are small.

In FIG. 1, second intake valve axis 30 is parallel to first intake valve axis 28, and second intake valve seat 38 is disposed in a plane which is parallel to the plane in which first intake valve seat 36 is disposed.

First intake valve seat 36 and second intake valve seat 38 are disposed to one side of a diameter of cylinder bore 14. Dual exhaust valves 60, 62 are disposed to the opposite side of that diameter and when open, allow exhaust to pass from the combustion chamber space to an exhaust port 64.

Actuator 39 comprises a shaft 66 which is linearly displaceable in a direction parallel to both first intake valve axis 28 and second intake valve axis 30, and is coupled to both via a bridge 68 to a first intake valve stem 70 of first intake valve 24 and to a second intake valve stem 72 of second intake valve 26.

FIGS. 6 and 7 show an embodiment which uses the same reference numerals as in FIG. 1, but is viewed from the opposite direction in a side elevation as in FIG. 6. The entire first semi-circumference 40 is closer, as measured along a direction parallel to cylinder bore axis 18, to a plane passing through piston 16 perpendicular to cylinder bore axis 18 than is second semi-circumference 42 as measured along a direction parallel to cylinder bore axis 18. Seated positions of intake valve heads 32, 34 are in solid lines, and unseated positions in broken lines.

What is claimed is:

1. An internal combustion engine comprising;
    a cylinder block comprising a cylinder bore within which a piston reciprocates along a central axis;
    a cylinder head assembled to the cylinder block in covering relation to an axial end of the cylinder bore and comprising an inlet port to the cylinder bore;
    a first intake valve and a second intake valve arranged side-by-side in the cylinder head for motion along a first intake valve axis and along a second intake valve axis respectively to open and close the inlet port to the cylinder bore, the first intake valve comprising a first intake valve head, and the second intake valve comprising a second intake valve head with the first intake valve axis being parallel to the second intake valve axis;
    the cylinder head comprising a first intake valve seat against which the first intake valve head seats when closing the inlet port to the cylinder bore and a second intake valve seat against which the second intake valve head seats when closing the inlet port to the cylinder bore with the first intake valve seat and the second intake valve seat being disposed in a plane parallel with one another;
    an actuator for opening and closing the first intake valve and the second intake valve in unison to unseat and re-seat the first intake valve head from and on the first intake valve seat and to unseat and re-seat the second intake valve head from and on the second intake valve seat;
    wherein the first intake valve axis is non-parallel to the cylinder bore axis, and the first intake valve seat is disposed in a plane which is non-parallel to a plane which is perpendicular to the cylinder bore axis; and
    wherein the first intake valve seat has a first semi-circumference, the second intake valve seat has a second semi-circumference, the first semi-circumference and the second semi-circumference are toward each other as viewed along the cylinder bore axis, and at least a portion of the first semi-circumference is closer, as measured along a direction parallel to the cylinder bore axis, to a plane passing through the piston perpendicular to the cylinder bore axis than is the second semicircumference as measured along a direction parallel to the cylinder bore axis.

2. The internal combustion engine as set forth in claim 1 wherein the first intake valve seat and the second intake valve seat are disposed to one side of a diameter of the cylinder bore.

3. The internal combustion engine as set forth in claim 2 wherein the entire first semi-circumference is closer, as measured along a direction parallel to the cylinder bore axis, to a plane passing through the piston perpendicular to the cylinder bore axis than is the second semi-circumference as measured along a direction parallel to the cylinder bore axis.

4. The internal combustion engine as set forth in claim 1 wherein the actuator comprises a shaft which is linearly displaceable in a direction parallel to both the first intake valve axis and the second intake valve axis, and is coupled by a bridge to both the first intake valve and the second intake valve.

5. The internal combustion engine as set forth in claim 1 wherein the entire first semi-circumference is closer, as measured along a direction parallel to the cylinder bore axis, to a plane passing through the piston perpendicular to the cylinder bore axis than is the second semi-circumference as measured along a direction parallel to the cylinder bore axis.

* * * * *